Sept. 25, 1945.                J. SLEZAK                 2,385,425
                            PIPE CONNECTION
                        Original Filed Aug. 3, 1942
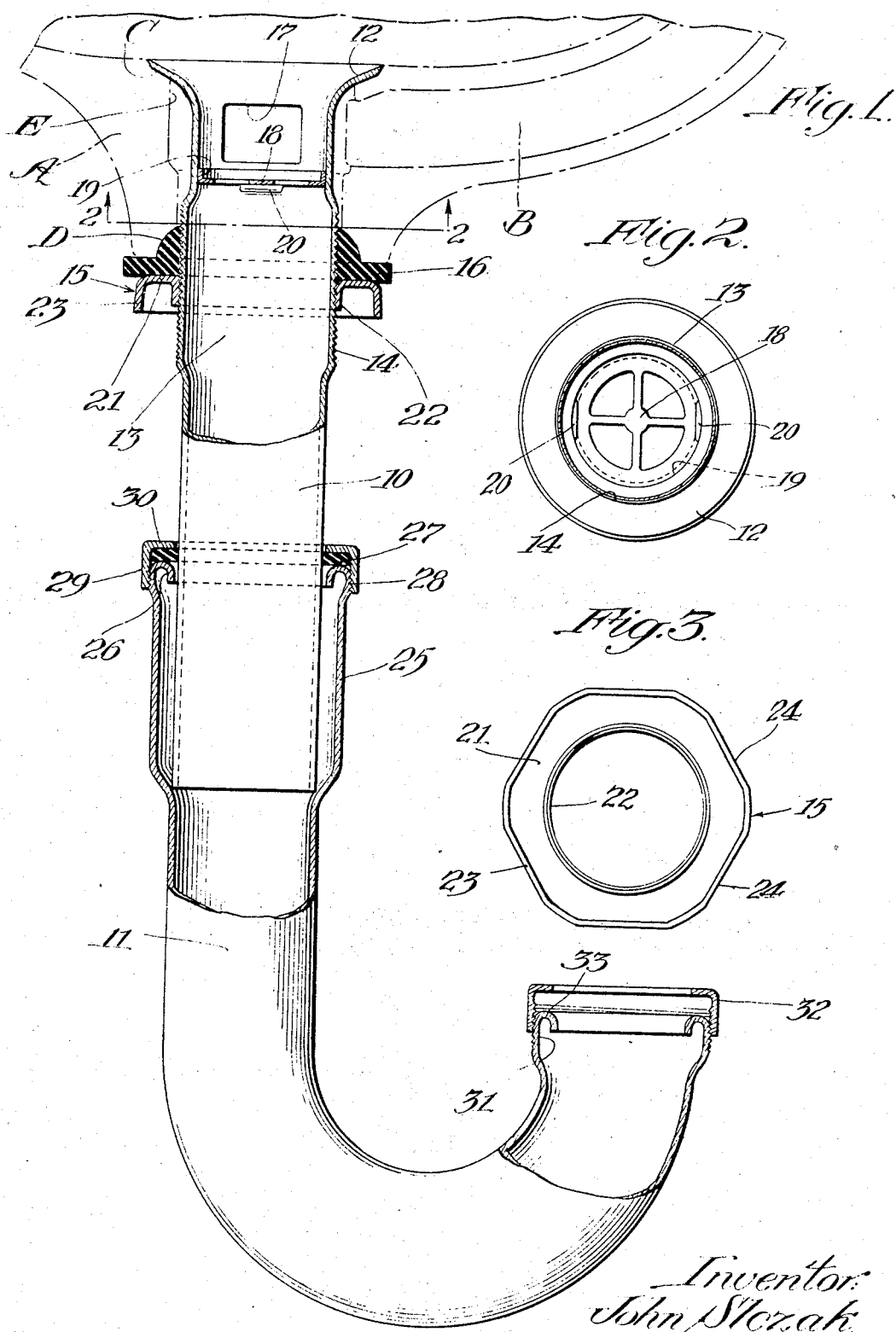
Inventor:
John Slezak
By [signature] Atty.

Patented Sept. 25, 1945

2,385,425

UNITED STATES PATENT OFFICE 2,385,425

PIPE CONNECTION

John Slezak, Sycamore, Ill., assignor to Turner Brass Works, Sycamore, Ill., a corporation of Illinois Original application August 3, 1942, Serial No. 453,333, now Patent No. 2,349,202, dated May 16, 1944. Divided and this application March 30, 1944, Serial No. 528,675

4 Claims. (Cl. 285—37)

This invention relates to plumbing fixtures and similar pipe connections and is shown as a part of a drain fitting adapted for use with a sink or lavatory bowl.

One object of the invention is to provide a new and improved pipe connection for the purpose indicated.

Another object of the invention is to provide a telescopic pipe connection adapted to be formed of thin, metallic tubing and including a threaded terminal and a sealing gland structure on one member of the connection.

More specifically, it is an object of the invention to provide a telescopic connection employing thin, metallic tubing with the end portion of one of the connected members expanded beyond its original diameter for telescopically receiving the other member and with the extreme end portion of the expanded member curled inwardly in the form of a reinforcing bead with threads on its external surface to receive a sealing gland.

Other objects and advantages of the invention will appear from the following description taken in connection with the drawing, in which:

Fig. 1 is an elevational view taken partially in section at an axial plane of the fitting, and showing the structure embodying this invention.

Fig. 2 is a top plan view of the fitting.

Fig. 3 is a transverse section, taken as indicated at line 3—3 on Fig. 1.

While I have shown in the drawing and shall herein describe in detail a preferred form of my invention, it is to be understood that I do not intend to limit the invention to the specific form or application disclosed, but aim to cover all modifications and alternative constructions falling within the scope of the invention as expressed in the claims.

This application is a division of my application Serial No. 453,333, filed August 3, 1942, which matured into Patent No. 2,349,202, May 16, 1944.

As an example of a situation to which a pipe connection embodying this invention is applicable, there is shown in the drawing an outlet pipe leading from the bottom of a sink or lavatory bowl and in the drawing a fragment of the lower portion of the bowl is shown in broken outline at A, including a portion of the overflow passage B, which customarily leads from an outlet in the upper edge of the bowl. The drain outlet in the bottom of the bowl includes a countersunk marginal portion C into which the metallic tubular outlet pipe is secured.

The drawing also shows a fitting constructed from a length of straight, metallic tubing and comprising a smooth, cylindrical portion 10 which is adapted to telescope with the adjacent fitting—ordinarily a U-shaped trap member shown at 11. At the upper end, the member 10 is flared to form a flange 12 which seats in the countersunk surface C of the lavatory bowl. An intermediate portion 13 of the tube 10 is expanded slightly beyond its original diameter and is externally threaded at 14 to receive a clamping nut 15. When the nut is tightened upwardly against the seal washer 16 seated in a recess D at the lower end of the drain outlet of the bowl A, the fitting is firmly secured in place by the cooperative clamping action of the nut 15 and the flange 12. The portion of the member 10 immediately below the flange 12 is provided with one or more ports 17 communicating with an annular passage E in the bowl which connects with the overflow passage B. Just below the outlets 17 a strainer disk as indicated at 18, having a peripheral flange 19 which holds it frictionally in position, is lodged against the inwardly pressed bosses 20 which are formed in the metallic wall of the member 10.

The clamping nut 15, as shown, is made of sheet metal comprising a transaxial web portion 21 with an annular, inner flange 22 internally threaded to fit the threads 14 of the fitting. A peripheral flange 23 is of non-circular outline, providing six flat faces 24 serving as the flat sides of a hexagon nut for the convenient application of a wrench in tightening the nut 15 against the sealing washer 16.

The U-shaped trap member 11 shown in connection with the fitting 10 is also of thin, metal tubing, and its upper portion is expanded at 25 to provide clearance for telescopic engagement with the member 10. The upper edge of the part 25 is curled inwardly as seen at 26, providing an upwardly facing lodgement surface for a sealing washer 27. As shown, the extreme upper portion of the trap member is slightly expanded beyond the diameter of the part 25, and is externally threaded at 28 to receive the threaded flange 29 of the cup-shaped nut or gland 30 which confines and encloses the sealing washer or packing member 27. Similarly, at its opposite end the U-tube 11 is formed with an expanded terminal portion 31 externally threaded to receive a packing nut 32 and internally curled or beaded at 33. In addition to providing seating area for packing washers, such as that shown at 27, the inwardly curled or beaded portions 26 and 33 form reinforcing channels which materially stiffen the threaded terminal portions of the U-tube. It will be understood that the terminal portion 31 is designed for telescopic engagement with an additional tubular member not shown; and it will also be understood that the expanded and inwardly curled terminal portions of the member 11 may be similarly formed on one or both ends of a straight tube or pipe for cooperation with a telescopically engaged tube section wherever such adjustable connections are desirable, the U-tube 11 being chosen merely as a convenient illustration and embodiment of this type of connection.

I claim as my invention:

1. In a pipe connection a unitary, tubular member of relatively thin stock, a portion of said member adjacent one end being expanded beyond the original diameter of the tubing and having threads formed directly in its external surface, and the extreme end portion of the member being curled inwardly in the form of a reinforcing bead.

2. In a pipe connection a tubular member having a straight cylindrical portion and a second member telescopically engaged therewith, a portion of said second member adjacent one end being expanded beyond the original diameter of the tubing and the extreme end portion of the expanded part being curled inwardly in the form of a reinforcing bead with an internal diameter dimensioned to receive the straight portion of the first-mentioned member, the external surface of the bead having threads formed directly therein and a threaded gland secured thereon with packing material clamped between the end surface of the bead and the gland in sealing engagement with the first-mentioned member.

3. In a pipe connection a member of thin walled tubing having a straight cylindrical portion at one end and a second tubular member of relatively thin stock having a portion adjacent one end expanded beyond the original diameter of the tubing and telescopically engaged with said straight cylindrical portion of the first member, the terminal portion of the second member being bent inwardly and the adjacent external surface thereof being threaded, a packing washer seated against said inwardly bent terminal and engaging the cylindrical wall of the first member and a cupped gland nut enclosing said packing washer and engaged with the threads of said second member.

4. A fitting of thin tubular stock having a portion of its wall adjacent the end doubled over upon itself and externally threaded.

JOHN SLEZAK.